(12) United States Patent
Sumino et al.

(10) Patent No.: US 8,315,002 B2
(45) Date of Patent: Nov. 20, 2012

(54) METHOD FOR PRODUCING A COLOR FILTER

(75) Inventors: Tomonobu Sumino, Tokyo-to (JP); Seiji Tawaraya, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 13/364,553

(22) Filed: Feb. 2, 2012

(65) Prior Publication Data

US 2012/0129085 A1 May 24, 2012

Related U.S. Application Data (60) Division of application No. 13/083,884, filed on Apr. 11, 2011, now Pat. No. 8,179,623, which is a continuation of application No. 10/592,346, filed as application No. PCT/JP2005/003954 on Mar. 8, 2005, now Pat. No. 7,948,697.

(30) Foreign Application Priority Data

Mar. 12, 2004 (JP) ................................ 2004-070621

(51) Int. Cl.
*G02B 5/22* (2006.01)
*G03F 1/00* (2012.01)
(52) U.S. Cl. .......................................... 359/891; 430/7
(58) Field of Classification Search .................. None
See application file for complete search history.

(56) References Cited

U.S. PATENT DOCUMENTS

| 2003/0118922 A1 | 6/2003 | Hayashi et al. |
| 2007/0099094 A1 | 5/2007 | Nemoto et al. |

FOREIGN PATENT DOCUMENTS

| JP | 07-244213 A | 9/1995 |
| JP | 08-327999 A | 12/1996 |
| JP | 09-113721 A | 5/1997 |
| JP | 09-120063 A | 5/1997 |
| JP | 10-142415 A | 5/1998 |
| JP | 2001-272526 A | 10/2001 |
| JP | 2003-114318 A | 4/2003 |
| JP | 2003-161825 A | 6/2003 |
| JP | 2003-161826 A | 6/2003 |
| JP | 2005-173532 A | 6/2005 |

OTHER PUBLICATIONS

USPTO NFOA mailed Dec. 26, 2007 in connection with U.S. Appl. No. 10/592,346.
USPTO FOA mailed Jul. 14, 2008 in connection with U.S. Appl. No. 10/592,346.

(Continued)

*Primary Examiner* — Jade R Chwasz
(74) *Attorney, Agent, or Firm* — Ladas & Parry LLP (57) ABSTRACT

A color filter including a transparent substrate; a light shielding part formed on the transparent substrate and contains at least a light shielding material and a resin; and a colored layer formed in the opening part of the light shielding part on the transparent substrate to cover a part of the light shielding part. The light shielding part has the width of the thick film region, 85% or more of the maximum film thickness of the light shielding part and disposed in the central part of the light shielding part; and the width of each of the thin film regions, 50% or less of the maximum film thickness of the light shielding part and disposed on the both side parts of the light shielding part.

3 Claims, 3 Drawing Sheets

OTHER PUBLICATIONS

USPTO FOA mailed Feb. 5, 2009 in connection with U.S. Appl. No. 10/592,346.
USPTO FOA mailed Oct. 14, 2009 in connection with U.S. Appl. No. 10/592,346.
USPTO NFOA mailed May 25, 2010 in connection with U.S. Appl. No. 10/592,346.
USPTO Supplemental NOA mailed Apr. 12, 2011 in connection with U.S. Appl. No. 10/592,346.
USPTO NOA mailed Jan. 26, 2011 in connection with U.S. Appl. No. 10/592,346.
USPTO NFOA mailed Sep. 2, 2011 in connection with U.S. Appl. No. 13/083,884.
USPTO NOA mailed Feb. 21, 2012 in connection with U.S. Appl. No. 13/083,884.
International Search Report: mailed Jul. 26, 2005; PCT/JP2005/003954.

METHOD FOR PRODUCING A COLOR FILTER

TECHNICAL FIELD

The present invention relates to a high quality color filter with little risk of disturbing the liquid crystal alignment, or the like at the time of being used for a liquid crystal display apparatus.

BACKGROUND ART

At the time of forming a color filter used for a liquid crystal display apparatus, in general, a method of forming a light shielding part on a transparent substrate for forming a color filter, and forming a colored layer in the opening part thereof, or the like is used. As such a light shielding part, conventionally, a metal thin film with a metal such as a chromium vacuum deposited and processed by etching has been used. Recently, however, development of a resin-made light shielding part formed by coating a resin with a black pigment, or the like dispersed and patterning by the photolithography method, or the like has been promoted so as to realize its practical use. According to such a resin-made light shielding part, as compared with a light shielding part comprising a metal thin film, the process of the vacuum deposition or the like can be eliminated so as to be used for a large area color filter, and thus it is advantageous.

However, as compared with the light shielding part comprising a metal thin film of such as a chromium, for obtaining a sufficient optical density, the film thickness should be large. Therefore, the film thickness of the colored layer formed to cover a part of the resin-made matrix for the purpose of preventing the void, or the like is made larger. As a result, the difference in the film thickness between the region with the light shielding part and the colored layer laminated, and the region with only the colored layer formed becomes larger.

Figure 4A:
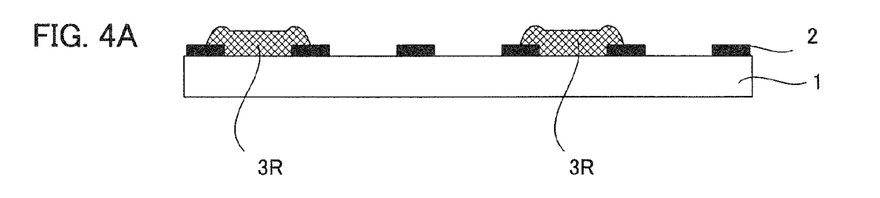
FIGS. 4A to 4E is a process diagram for explaining an example of a method for forming a colored layer of a common color filter.
Figure 4B:
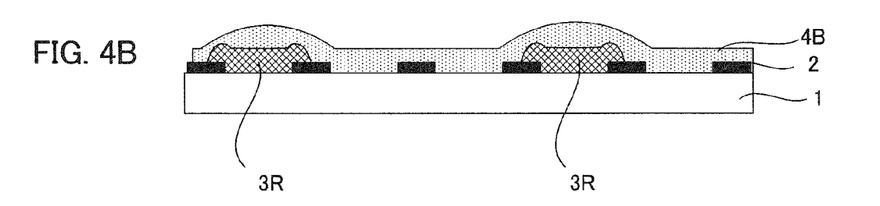
Figure 4C:
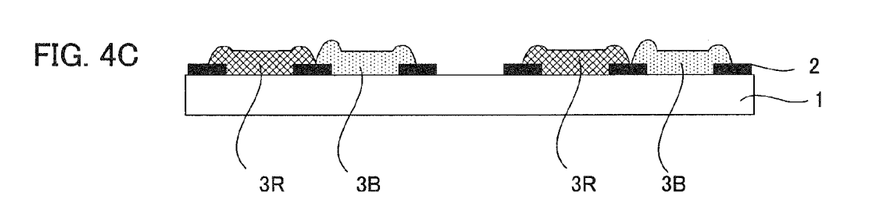
Figure 4D:
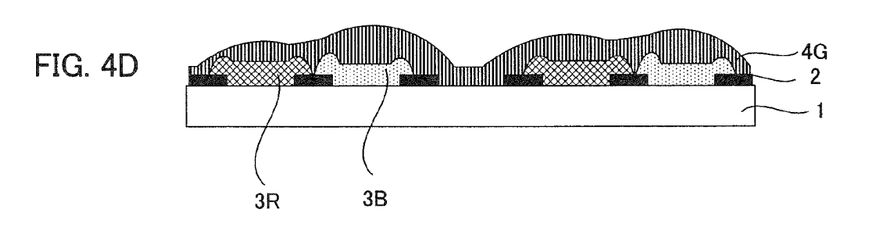
Figure 4E:
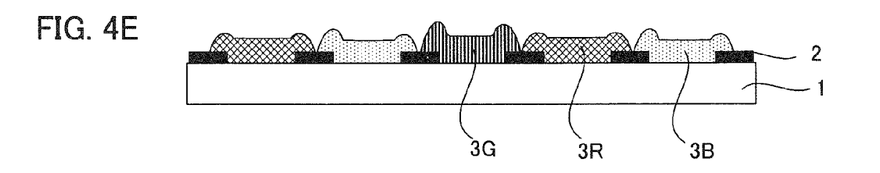

In particular, in the case where the colored layers of such as red (R), green (G), blue (B) are formed by a plurality of times on a transparent substrate with the light shielding part formed, the difference in the film thickness between the region with the light shielding part and the colored layer laminated, and the region with only the colored layer formed becomes larger. The method for forming the colored layer of such a color filter will be explained with reference to, for example, FIGS. 4A to 4E. First, the colored layer 3R of a first color is formed on the opening part of the transparent substrate 1 with the light shielding part 2 formed so as to cover a part of the light shielding part 2 by the photolithography method, or the like (FIG. 4A). Subsequently, by coating a colored layer forming composition 4B for forming the colored layer of a second color onto the transparent substrate 1 with the colored layer 3R formed (FIG. 4B), and curing only the purposed region, a colored layer 3B is formed (FIG. 4C). Here, at the time of coating the above-mentioned colored layer forming composition 4B, the colored layer 3R is formed on the transparent substrate 1 so that the film thickness of the colored layer forming composition 4B coated thereon becomes larger in the vicinity of the region with the colored layer 3R formed. Therefore, the film thickness on the colored layer 3R side of the colored layer 3B to be formed by curing the colored layer forming composition 4B becomes higher than the film thickness of the colored layer 3R. In the same manner, in the case of applying a colored layer forming composition 4G to be formed for the third color (FIG. 4D), since the colored layers 3R, and 3G are already formed on the both sides of the region for forming the colored layer, the film thickness of the colored layer forming composition 4G becomes higher in the vicinity thereof so that at the time of providing the colored layer 3G by curing, or the like, as compared with the colored layers 3R and 3B, the film thickness in the region laminated with the light shielding part 2 becomes higher (FIG. 4E).

In the case where the color filter has a difference in a film thickness between the region with the light shielding part and the colored layer laminated and the region with only the colored layer formed accordingly, the problems such as a disturbance of the alignment of the liquid crystal in the liquid crystal layer formed on the color filter so as to generate the light leakage, or breakage of the ITO film formed on the color filter have been generated. Furthermore, the problem such as causing unevenness of the gap at the time of disposing the color filter and the counter substrate to face to each other has been involved.

Figure 5A:
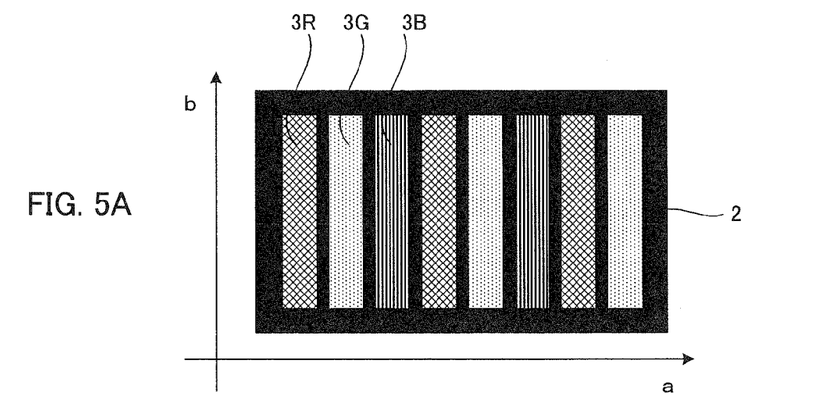
FIGS. 5A and 5B are explanatory diagrams for explaining a color filter having a common stripe type colored layer.

Moreover, in the case of a color filter having a stripe-shaped colored layer, for example, as shown in FIG. 5A, the colored layer 3 is formed in a stripe form on the transparent substrate with the light shielding part 2 formed. Here, the light shielding part 2 is formed orthogonally with the colored layer 3 in the a direction. For example, as shown in the cross sectional view in the b direction (FIG. 5B) of FIG. 5A, in the portion with the light shielding part 2 orthogonal to the colored layer 3, the light shielding part 2 is totally covered with the colored layer 3. At the time, as mentioned above, in the case where the film thickness of the resin-made light shielding part 2 is large, the difference in the film thickness between the region with the light shielding part 2 and the colored layer 3 laminated, and the region with only the colored layer 3 formed becomes larger. Moreover, since the difference in the film thickness continues like a line in the a direction, it may become a cause of further disturbing the liquid crystal alignment or a cause of generating the breakage of the ITO film.

DISCLOSURE OF THE INVENTION

Problem to be Solved by the Invention

From the above-mentioned, a high quality color filter with little difference in the thickness between the film thickness of the region with the resin-made light shielding part and the colored layer superimposed, and the film thickness of the region with only the colored layer formed, and with little liquid crystal alignment disturbance, or the like has been desired to be provided.

Means for Solving the Problem

The present invention provides a color filter comprising: a transparent substrate, a light shielding part formed on the transparent substrate and contains at least a light shielding material and a resin; and a colored layer formed in the opening part of the light shielding part on the transparent substrate to cover a part of the light shielding part, characterized in that the light shielding part has: the width of the thick film region, 85% of more of the maximum film thickness of the above-mentioned light shielding part and disposed in the central part of the light shielding part, in a range of 30% to 60% of the light shielding part line width; and the width of each of the thin film regions, 50% or less of the maximum film thickness of the light shielding part and disposed on the both side parts of the light shielding part, in a range of 10% to 20% of the light shielding part line width.

According to the present invention, since the width of the above-mentioned thick film region disposed in the central part of the light shielding part is in the above-mentioned range, and the width of the above-mentioned thin film region disposed in the both side parts of the light shielding part is in the above-mentioned range, the film thickness in the central part of the light shielding part can be made relatively small so as to have a light shielding part with a gently sloping shape, or the like. Thereby, for example, at the time of coating a colored layer forming composition for forming a colored layer on alight shielding part, or the like, the coating amount of the colored layer forming composition to be applied on the central part of the light shielding part can be made less so that the film thickness in the portion with the colored layer and the light shielding part laminated can be provided smaller. Moreover, for example, in the case where the color filter of the present invention is a color filter having a stripe type colored layer, also in the portion with the stripe type colored layer and the light shielding part provided orthogonally so that the stripe type colored layer and the light shielding part are laminated, the film thickness of the stripe type colored layer formed on the thick film region of the light shielding part can be provided thinly so that the difference of the film thickness with respect to the region with only the stripe type colored layer formed can be made smaller. Thereby, at the time of using the color filter for the liquid crystal display apparatus, occurrence of such as a disturbance of the alignment of the liquid crystal layer formed on the color filter, breakage of the ITO film or unevenness of the gap with respect to the oppositely facing substrate can be made smaller. Moreover, also in the case where a colored layer is formed in a bent pattern in a color filter for IPS (In Plane Switching)-mode, the same can be applied.

In the above-mentioned invention, it is preferable that the difference between the maximum film thickness of the stacked part with the colored layer superimposed on a part of the light shielding part and the film thickness of the central part of the colored layer formed in the opening part of the light shielding part is 0.5 μm or less. Thereby, occurrence of such as an irregularity of the alignment of the liquid crystal layer formed on the color filter of the present invention or breakage of the ITO film can further be reduced.

Further, the present invention provides a color filter comprising: a transparent substrate; a light shielding part formed on the transparent substrate and contains at least a light shielding material and a resin; a colored layer formed in the opening part of the light shielding part on the transparent substrate to cover a part of the light shielding part; and a crossing part with the colored layer and the light shielding part crossing each other such that the colored layer covers the light shielding part, characterized in that the difference between the maximum film thickness of the crossing part and the film thickness of the central part of the colored layer formed in the opening part of the light shielding part is 0.5 μm or less.

According to the present invention, for example, in a stripe type color filter or a color filter with a colored layer formed in a bent pattern having the above-mentioned crossing part has the difference between the above-mentioned crossing part and the film thickness of the colored layer in the above-mentioned range. As a result, occurrence of such as an irregularity of the alignment of the liquid crystal layer formed on the color filter of the present invention or unevenness of the gap with respect to the oppositely facing substrate can be reduced.

Effect of the Invention

According to the present invention, the film thickness of the portion with the colored layer and the light shielding part superimposed can be made lower. Moreover, in the case where a color filter of the present invention is, for example, a color filter having a stripe type colored layer, also concerning the portion with the stripe type colored layer and the light shielding part laminated, wherein with the stripe type colored layer and the light shielding part provided orthogonally, the film thickness of the stripe type colored layer formed on the thick film region of the light shielding part can be made smaller. Thereby, at the time of using a color filter of the present invention for a liquid crystal display apparatus, occurrence of such as a disturbance of the alignment of the liquid crystal layer formed on the color filter, breakage of the ITO film, unevenness of the gap with respect to the oppositely facing substrate can be reduced.

EXPLANATION OF REFERENCES

1 . . . Transparent substrate
2 . . . Light shielding part
3 . . . Colored layer
4 . . . Stacked part
5 . . . Orthogonally stacked part

BEST MODE FOR CARRYING OUT THE INVENTION

The present invention relates to a high quality color filter with little risk of disturbing the liquid crystal alignment, or the like at the time of being used for a liquid crystal display apparatus, and it includes two embodiments. Hereinafter, each embodiment will be explained in detail.

1. First Embodiment

First, a first embodiment of the color filter of the present invention will be explained. The first embodiment of the color filter of the present invention is a color filter comprising: a transparent substrate; a light shielding part formed on the transparent substrate and contains at least a light shielding material and a resin; and a colored layer formed in the opening part of the light shielding part on the transparent substrate to cover a part of the light shielding part, characterized in that the width of the thick film region, 85% of more of the maximum film thickness of the light shielding part and disposed in the central part of the light shielding part, is in a predetermined range with respect to the light shielding part line width, and the width of each of the thin film regions, 50% or less of the maximum film thickness of the light shielding part and disposed on the both side parts of the light shielding part, is in a predetermined range with respect to the light shielding part line width.

Figure 1A:
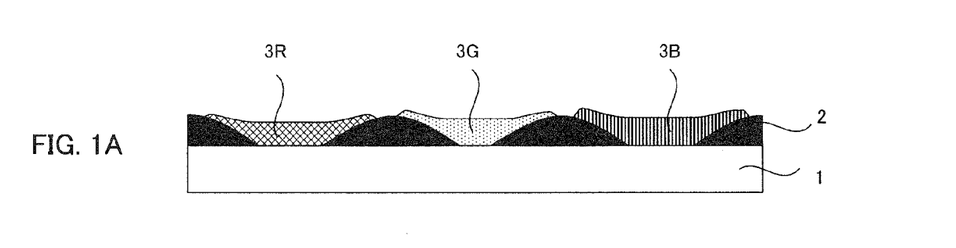
FIGS. 1A and 1B are explanatory diagrams for explaining a color filter of the present invention.
Figure 1B:
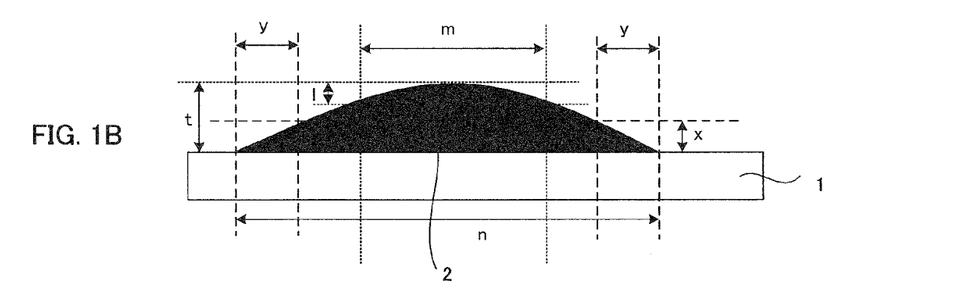

For example, as shown in FIG. 1A, the color filter of this embodiment is a color filter comprising a transparent substrate 1, a light shielding part 2 formed on the transparent substrate 1, and a colored layer 3 (3R, 3G and 3B) formed to cover the light shielding part 2 partially, wherein, for example, as shown in FIG. 1B, the light shielding part 2 has the width m of a thick film region having a film thickness of a predetermined ratio or more with respect to the maximum film thickness t of the light shielding part in a predetermined range with respect to the light shielding part line width n in the central part of the light shielding part 2, and the width y of a thin film region having a film thickness of a predetermined ratio or less with respect to the maximum film thickness t of the light shielding part is each in a predetermined range with respect to the light shielding part line width n in the both side parts of the light shielding part 2. The light shielding part line width denotes the width from the end part to the other end part of the light shielding part. Moreover, the above-mentioned side parts denote the region including the end part of the light shielding part, and the central part denotes the region including the maximum film thickness part of the light shielding part. The shape of the above-mentioned light shielding part denotes the light shielding part shape in the effective display area of the color filter.

Here, in the case where a color filter is formed using a resin-made light shielding part having a common shape, as mentioned above, since the film thickness of the light shielding part is large in the portion with the colored layer and the light shielding part superimposed, the colored layer is formed in a hogged form so as to generate the difference in the film thickness with respect to the region with only the colored layer formed and to have a step. Thereby, in the case where the color filter is used for a liquid crystal display apparatus, the light leakage may be generated due to the disturbance of the liquid crystal alignment in the liquid crystal layer to be disposed onto the step, or the ITO film may be broken by the step, or the like. Moreover, for example, in the case of keeping the gap between the color filter and the oppositely facing substrate using a bead-shaped spacer, a problem is involved in such as that the gap between the oppositely facing substrate and the color filter cannot be constant due to the step.

On the other hand, according to this embodiment, a shape with the width of the above-mentioned thick film region in the central part of the light shielding part provided relatively narrowly and the width of the above-mentioned thin film regions in the both end parts provided relatively widely can be provided. Thereby, for example, in the case where a colored layer is formed on the light shielding part, the film thickness with the colored layer and the light shielding part laminated can be made relatively small so that the difference with respect to the film thickness of the colored layer formed in the opening part of the light shielding part can be made smaller. Therefore, at the time of using the color filter of this embodiment for a liquid crystal display apparatus, a high quality color filter capable of constantly keeping the gap between the oppositely facing substrate and the color filter with little influence on such as the alignment property of the liquid crystal layer formed on the color filter or the ITO film can be provided.

Here, the above-mentioned thick film region is a region in the central part of the light shielding part with 85% or more of the maximum film thickness of the light shielding part, and the above-mentioned thin film region is a region in the both end parts of the light shielding part with 50% or less of the maximum film thickness of the light shielding part. The maximum film thickness of the light shielding part denotes the film thickness of the portion where the film thickness in each light shielding part is largest.

In this embodiment, it is preferable that the thick film region width is in a range of 30% to 60% of the light shielding part line width, in particular, in a range of 30% to 50%. Moreover, it is preferable that the above-mentioned width of the thin film region, that is, the distance from the end part of the light shielding part to the portion with the 50% film thickness of the maximum film thickness of the light shielding part is in a range of 10% to 20% of the light shielding part line width at the both side parts. Thereby, even in the case of forming the colored layer on the light shielding part, the difference in the film thickness between the region with only the colored layer formed and the region with the colored layer covering the light shielding part can be made smaller.

As to the measurement of the width of the above-mentioned thick film region or thin film region can be calculated by, for example, the cross sectional shape of the central part of the light shielding part photographed with a scanning electron microscope (SEM), or the like.

Figure 2:
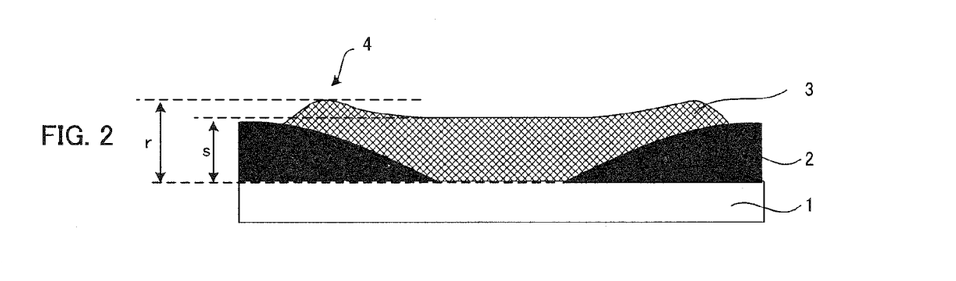
FIG. 2 is an explanatory diagram for explaining a light shielding part used in the present invention.

Moreover, here, in this embodiment, for example, as shown in FIG. 2, it is preferable that the difference between the maximum film thickness r of the stacked part 4 with the colored layer 3 superimposed on a part of the light shielding part 2 and the film thickness s of the central part of the colored layer 3 formed in the opening part of the light shielding part 2 is 0.5 µm or less, preferably 0.4 µm or less, and particularly preferably 0.3 µm or less. According to the range, disturbance of the alignment of the liquid crystal on the stacked part, breakage of the ITO film, or the like can be more effectively prevented, and moreover, the gap of the liquid crystal display apparatus can be made constant. The above-mentioned stacked part denotes the region with the light shielding part and the colored layer laminated. Further, the film thickness of the central part of the colored layer denotes the film thickness of, for example, the colored layer at the crossing of the diagonals of the rectangle in the case where the shape of the opening part of the light shielding part is a rectangle. Here, as mentioned above, in the case where the colored layer is formed separately by a plurality of times, it is preferable that the difference between the film thickness of the all stacked parts and the film thickness of the central part of the colored layer is in the above-mentioned range.

Hereinafter, the color filter of this embodiment will be explained in detail for each configuration.

(Light Shielding Part)

First, the light shielding part used in this embodiment will be explained. The light shielding part used in this embodiment is to be formed on the transparent substrate to be described later, and it contains at least a light shielding material and a resin so as to be used as the light shielding part of a color filter.

The shape of the light shielding part in this embodiment is not particularly limited as long as it is a shape to have the width of the above-mentioned thick film region and the above-mentioned thin film region in a predetermined range, and it can be formed particularly preferably in a hogged form. Thereby, the film thickness of the colored layer formed on the thick film region of the light shielding part can be made smaller.

Moreover, the width of the light shielding part entirety used in this embodiment, that is, the light shielding part line width is, although it also depends on the shape of the color filter, or other factors, in general in a range of 6 µm to 35 µm, preferably 10 µm to 30 µm, and particularly preferably 16 µm to 30 µm. In the case where the color filter of this embodiment is used for the mobile application, it is preferable that the above-mentioned light shielding part line width is in a range of 6 µm to 15 µm. Moreover, although the height can also be selected optionally, it is in general 0.5 µm to 2.5 µm, preferably 0.8 µm to 2.5 µm, and particularly preferably about 0.8 µm to 1.5 µm.

In this embodiment, the colored layer to be described later is formed to cover a part of the light shielding part. The width of the light shielding part to be covered with the colored layer is in general about 2 µm to 10 µm from the end part of the light shielding part, and it is preferably about 2 µm to 6 µm. Thereby, a high quality color filter without a void, or the like can be provided.

Here, the material, or the like of the above-mentioned light shielding part is not particularly limited as long as at least the light shielding material and the resin are contained. In general, the light shielding part can be formed with a light shielding part forming composition with a photo initiator, a monomer, or the like added to the light shielding material and the resin.

As the above-mentioned light shielding material, a material used for a resin-made light shielding part to be used in general for a color filter can be used. For example, carbon fine particles, light shielding particles of such as a metal oxide, an inorganic pigment or an organic pigment can be presented.

As the resin to be contained in the light shielding part used in the present embodiment, the following examples can be cited: an ethylene-vinyl acetate copolymer, an ethylene-vinyl chloride copolymer, an ethylene-vinyl copolymer, a polystyrene, an acrylonitrile-styrene copolymer, a ABS resin, a polymethacrylic acid resin, an ethylene-methacrylic acid resin, a polyvinyl chloride resin, a chlorinated vinyl chloride, a polyvinyl alcohol, a cellulose acetate propionate, a cellulose acetate butylate, a nylon 6, a nylon 66, a nylon 12, a polyethylene terephthalate, a polybutylene terephthalate, a polycarbonate, a polyvinyl acetal, a polyether ether ketone, a polyether sulfone, a polyphenylene sulfide, a polyallylate, a polyvinyl butylal, an epoxy resin, a phenoxy resin, a polyimide resin, a polyamide imide resin, a polyamic acid resin, a polyether imide resin, a phenol resin, a urea resin.

Furthermore, a polymer or a copolymer comprising one or more kinds selected from the group consisting of a methyl (meth)acrylate, an ethyl(meth)acrylate, a n-propyl (meth) acrylate, an isopropyl(meth)acrylate, a sec-butyl (meth)acrylate, an isobutyl(meth)acrylate, a tert-butyl (meth)acrylate, a n-pentyl(meth)acrylate, a n-hexyl (meth)acrylate, a 2-ethyl hexyl(meth)acrylate, a n-octyl (meth)acrylate, a n-decyl (meth)acrylate, a styrene, an α-methyl styrene, a N-vinyl-2-pyrolidone as a polymerizable monomer and a glycidyl (meth)acrylate, and one or more kinds selected from the group consisting of a dimer of a (meth) acrylic acid and an acrylic acid (such as M-5600 manufactured by TOA GOSEI CO., LTD.), an itaconic acid, a crotonic acid, a maleic acid, a fumaric acid, a vinyl acetate and an anhydride thereof can also be presented. Moreover, a polymer produced by adding an ethylenically unsaturated compound having a glycidyl group or a hydroxyl group to the copolymer, or the like can also be presented, but it is not limited thereto.

Among the examples, since a polymer containing an ethylenically unsaturated bond forms a cross linking bond with a monomer so as to obtain the excellent strength, it can be used particularly preferably.

As the monomer which can be used to form the light shielding part used in the present embodiment, polyfunctional acrylate monomers can be cited as an example, and a compound having two or more ethylenic unsaturated bonds containing group such as an acrylic group and a methacrylic group can be used. Specifically, an ethylene glycol(meth) acrylate, a diethylene glycol di(meth)acrylate, a propylene glycol di(meth)acrylate, a dipropylene glycol di(meth)acrylate, a polyethylene glycol di(meth)acrylate, a polypropylene glycol di(meth)acrylate, a hexane di(meth)acrylate, a neopenthyl glycol di(meth)acrylate, a glycerin di(meth)acrylate, a glycerin tri(meth)acrylate, a trimethylol propane tri(meth) acrylate, a 1,4-butane diol diacrylate, pentaerythritol(meth) acrylate, a pentaerythritol tri(meth))acrylate, a pentaerythritol tetra(meth)acrylate, a dipentaerythritol hexa(meth) acrylate, a dipentaerythritol penta(meth)acrylate or the like can be presented as an example.

The polyfunctional acrylate monomers may be used as a combination of two or more kinds. In this embodiment, a (meth)acrylic denotes either of an acryl or a methacryl, and a (meth)acrylate denotes either of an acrylate group or a methacrylate.

As the photo initiator which can be used in the present embodiment, a photo radical polymerization initiating agent to be activated by a ultraviolet ray, an ionizing radiation, a visible light, or an energy line of the other wavelengths, in particular, 365 nm or less can be used.

As such a photo polymerization initiating agent, specifically, a benzophenone, an o-benzoyl methyl benzoate, a 4,4-bis(dimethyl amine) benzophenone, a 4,4-bis(diethyl amine) benzophenone, an α-amino-acetophenone, a 4,4-dichlorobenzophenone, a 4-benzoyl-4-methyl diphenyl ketone, a dibenzyl ketone, a fluolenone, a 2,2-diethoxy acetophenone, a 2,2-dimethoxy-2-phenyl acetophenone, a 2-hydroxy-2-methyl propiophenone, a p-tert-butyl dichloroacetophenone, a thioxantone, a 2-methyl thioxantone, a 2-chlorothioxantone, a 2-isopropyl thioxantone, a diethyl thioxantone, a benzyl dimethyl ketal, a benzyl methoxy ethyl acetal, a benzoin methyl ether, a benzoin butyl ether, an anthraquinone, a 2-tert-butyl anthraquinone, a 2-amyl anthraquinone, a β-chloranthraquinone, an anthrone, a benzanthrone, a dibenzsuberone, a methylene anthrone, a 4-adidobenzyl acetophenone, a 2,6-bis(p-adidobendilidene)cyclohexane, a 2,6-bis (p-adidobendilidene)-4-methyl cyclohexanone, a 2-phenyl-1,2-butadion-2-(o-methoxy carbonyl)oxime, a 1-phenyl-propane dion-2-(o-ethoxy carbonyl)oxime, a 1,3-diphenyl-propane trion-2-(o-ethoxy carbonyl)oxime, a 1-phenyl3-ethoxy-propane trion-2-(o-benzoyl)oxime, a Michler's ketone, a 2-methyl-1[4-(methyl thio) phenyl]-2-morpholino propane-1-on, a 2-benzyl-2-dimethyl amino-1-(4-morpholino phenyl)-butanone, a naphthalene sulfonyl chloride, a quinoline sulfonyl chloride, a n-phenyl thioacrydone, a 4,4-azo bis isobuthylonitrile, a diphenyl disulfide, a benzthiazol disulfide, a triphenyl phosphine, a camphor quinone, N1717 manufactured by Asahi Denka Co., Ltd. a carbon tetrabromate, a tribromo phenyl sulfone, a benzoin peroxide, an eosin, a combination of a photo reducing pigment such as a methylene blue and a reducing agent such as an ascorbic acid and a triethanol amine, or the like can be presented as an example. In this embodiment, these photo polymerization-initiating agents can be used alone or as a combination of two or more kinds.

Here, in this embodiment, as a method for forming a light shielding part to have the above-mentioned shape, a method of providing the thermoplasticity to the light shielding part forming composition, or the like by such as using a low molecular material out of the above-mentioned resins as the resin to be contained in the light shielding part forming composition, or adding a large amount of the above-mentioned monomer can be presented. In this case, by forming a rectangular light shielding part and subsequently applying the heat to the light shielding part by the same method as for the common light shielding part in the region to form the light shielding part, the light shielding part forming composition can be softened so as to provide the above-mentioned shape.

Moreover, for example, a method of using a surface curing photo initiator by a large amount out of the above-mentioned photo initiators as the photo initiator to be contained in the above-mentioned resin composition can be presented. In this case, for example, at the time of executing etching by such as a photolithography method, since the photosetting does not proceed completely in the inside of the light shielding part even though the surface of the region to have the light shielding part formed is cured, it is etched in an inverse tapered shape with a high angle. Therefore, after finishing the etching operation, by post baking the inversely tapered light shielding part, the tapered portion is lowered so that the light shielding part having the above-mentioned shape can be formed.

Furthermore, a method of pouring the above-mentioned light shielding part forming composition into a mold having a shape for forming the light shielding part to cure, and attaching the light shielding part onto a transparent substrate, or the like can also be used. Moreover, by utilizing a half tone mask and changing the exposing amount, a light shielding part having the above-mentioned shape can also be formed.

(Colored Layer)

Next, the colored layer used in this embodiment will be explained. The shape or the like of the colored layer used in this embodiment is not particularly limited as long as it is formed in the opening part of the above-mentioned light shielding part so as to cover a part of the light shielding part as mentioned above. For example, three colored layer forming compositions of red (R), green (B) and blue (B) can be used in a known arrangement such as the stripe type, the mosaic type, the triangle type, and the four pixel arrangement type, with the coloring area set optionally. The above-mentioned opening part denotes a region without formation of the light shielding part on the transparent substrate.

In this embodiment, a stripe type colored layer is particularly preferable, as it will be explained in the second embodiment to be described later. Thereby, the advantages of this embodiment can be utilized also in a region with the colored layer and the light shielding part provided orthogonally.

Here, the film thickness of the colored layer formed in this embodiment can be selected optionally according to the targeted color filter. It is in general about 1.0 μm to 3.0 μm, and more preferably about 1.2 μm to 2.5 μm. Thereby, the difference of the film thickness between the region formed in the opening part of the light shielding part and the region formed on the light shielding part can be made smaller.

The formation method of the colored layer used in this embodiment can be a method used at the time of producing a common color filter such as the photolithography method and the ink jet method. Moreover, since the material of the colored layer used in this embodiment can be same as a colored layer used for a common color filter, detailed explanation is omitted here.

(Transparent Substrate)

Next, the transparent substrate used in this embodiment will be explained. The transparent substrate used in this embodiment is not particularly limited as long as it can be generally used for a color filter. A transparent rigid material without flexibility such as a quartz glass, a Pyrex (registered trademark) glass and a synthetic quartz plate, or a transparent flexible material having the flexibility such as a transparent resin film and an optical resin plate can be used.

(Color Filter)

The color filter in this embodiment is not particularly limited as long as the above-mentioned light shielding part and the above-mentioned colored layer are formed on the above-mentioned transparent substrate. For example, as needed, a protection layer, an electrode layer, or the like may be formed.

2. Second Embodiment

Next, a second embodiment of the color filter of the present invention will be explained. The second embodiment of the color filter of the present invention is a color filter comprising: a transparent substrate; a light shielding part formed on the transparent substrate and contains at least a light shielding material and a resin; a colored layer formed in the opening part of the light shielding part on the transparent substrate to cover a part of the light shielding part; and a crossing part with the colored layer and the light shielding part crossing each other such that the colored layer covers the light shielding part, characterized in that the difference between the maximum film thickness of the crossing part and the film thickness of the central part of the colored layer formed in the opening part of the light shielding part is in a predetermined range.

Figure 5B:
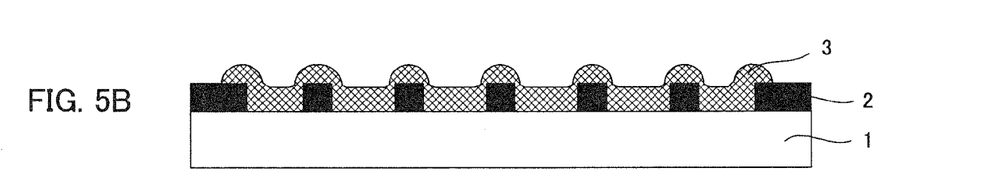

The above-mentioned crossing part denotes a region with the colored layer and the light shielding part laminated in a region with the colored layer and the light shielding part crossing each other. As a color filter having such a crossing part, for example, a color filter having a stripe type colored layer 3, as shown in FIG. 5A can be presented. According to a color filter having a stripe type colored layer, since the light shielding part 2 is formed also in the a direction of FIG. 5A, for example, as shown in FIG. 5B, a portion with the light shielding part 2 and the colored layer 3 crossing each other covered with the colored layer 3.

Figure 6:
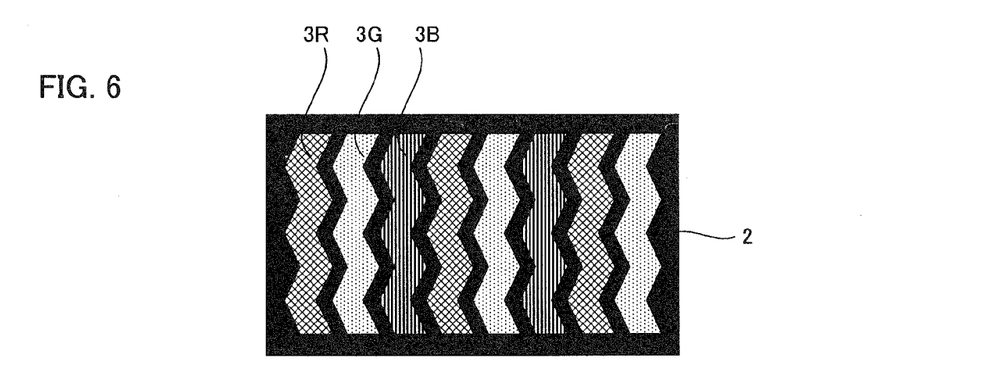
FIG. 6 is an explanatory diagram for explaining a colored layer formed in a bent pattern in a color filter for IPS (In Plane Switching)-mode.

Moreover, as a color filter having a crossing portion with the colored layer crossing the light shielding part to cover the same, for example, as shown in FIG. 6, the case of forming the colored layer 3 in a bent pattern in a color filter for IPS (In Plane Switching)-mode can be presented. According to a color filter for IPS (In Plane Switching)-mode, for example, as it is disclosed in the official gazette of the Japanese Patent Application Laid Open (JP-A) No. 9-311334, a colored layer formed in a bent pattern is used commonly in terms of the viewing angle, or the like. According also to such a color filter, as in the case of the above-mentioned stripe type colored layer, the light shielding part is formed by crossing the colored layer for sectioning the colored layer.

Figure 3:
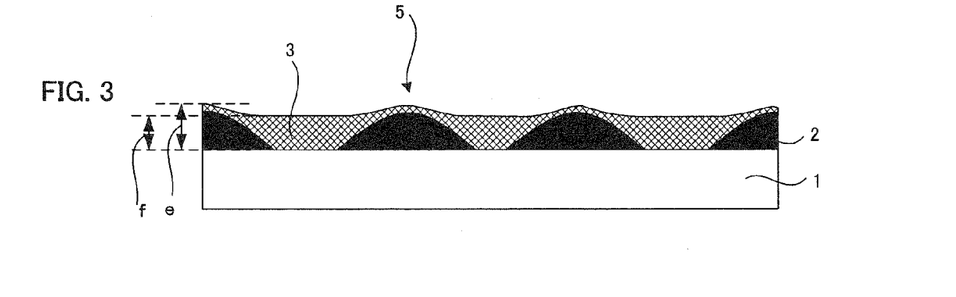
FIG. 3 is an explanatory diagram for explaining a light shielding part used in the present invention.

Here, in this embodiment, the difference between the maximum film thickness of the crossing part and the film thickness in the central part of the colored layer formed in the opening part of the light shielding part is in a predetermined range. For example, as shown in the cross sectional view in the b direction (FIG. 3) of FIG. 5A, the difference between the maximum film thickness e of the light shielding part 2 formed on the transparent substrate L and the colored layer 3 formed to cover the entirety of the light shielding part 2 and the film thickness f of the central part in the stripe type colored layer 3 formed in the opening part of the light shielding part 2 is formed in a predetermined range. Thereby, at the time of using the color filter of this embodiment in a liquid crystal display apparatus, the problems such as an occurrence of disturbance of the alignment of the liquid crystal formed on the color filter, breakage of the ITO film formed on the color filter, or unevenness of the gap between the oppositely facing substrate and the color filter can be reduced.

The difference of the film thickness between the crossing part and the colored layer central part is specifically, in a range of 0.5 μm or less, preferably 0.1 μm to 0.4 μm, and particularly preferably 0.1 μm to 0.2 μm. The maximum film thickness of the crossing part denotes the film thickness of a portion with the film thickness of the light shielding part and the colored layer in the crossing part provided maximally.

Here, in this embodiment, the forming method, the forming material, or the like of the color filter are not particularly limited as long as the difference in the film thickness of the crossing part and of the central part of the colored layer can be in the above-mentioned range. It is particularly preferable to use the light shielding part of the color filter explained in the above-mentioned "1. First embodiment" since the above-mentioned difference of the film thickness can be realized.

Since the light shielding part, the colored layer, the transparent substrate, or the like used in this embodiment can be same as those in the above-mentioned "1. First embodiment", detailed explanation is omitted here. Moreover, for the color filter of this embodiment, as needed, other members may also be provided.

The present invention is not limited to the above-mentioned embodiments. The above-mentioned embodiments are examples and any one substantially having the same configuration as the technological idea disclosed in the claims of the present invention so as to achieve the same effects is included in the technological scope of the present invention.

EXAMPLES

Hereinafter, with reference to the example and the comparative example, the present invention will be explained further specifically.

Example

As the substrate for a color filter substrate, a 0.7 mm thickness glass substrate (produced by Coning Inc., 1737 glass) was prepared. After washing the substrate by an ordinary method, a photosensitive resin composition for a black matrix having the following composition was coated on one entirety side of the substrate, and heated on a hot plate after drying. Thereafter, after the exposure via a predetermined photo mask, it was developed excessively and baked so as to form a black matrix (line width: 14.4 μm, thickness 1.1 μm). The thick film region at the time was 5.8 μm, and the thin film region was 2.4 μm.

(Composition for a black matrix)
  Carbon black 61 parts by weight
  Photosensitive resin composition 39 parts by weight
  Methoxy butyl acetate 300 parts by weight The above-mentioned photosensitive resin composition has the under-mentioned composition. The same is applied to the photosensitive resin composition to be used in the following example.

(Photosensitive Resin Composition)
  Acrylic resin 32 parts by weight
  Dipentaerythritol hexaacrylate 42 parts by weight
  Epicoat 180S70 (produced by Mitsubishi Yuka Shell Corp.) 18 parts by weight
  Irg. 907 (produced by Ciba Specialty Chemicals,) 8 parts by weight Next, each coating solution for a red pattern, a green pattern and a blue pattern of the under-mentioned composition was prepared, and using them, a red pattern, a green pattern and a blue pattern (each thickness 1.7 μm) were respectively formed in a pixel region according to a known pigment dispersion method to provide a color filter. The difference between the maximum film thickness in the stacked part with the colored layer superimposed on a part of the light shielding part of the formed color filter and the film thickness of the central part of the colored layer formed in the opening part of the light shielding part was 0.3 μm.

(Composition of a Coating Solution for a Red Pattern)
  PR254 dispersion 33 parts by weight
  Photosensitive resin composition 67 parts by weight
  Propylene glycol monomethyl ether acetate 400 parts by weight (Composition of a Coating Solution for a Green Pattern)
  PG36/PY150 dispersion 34 parts by weight
  Photosensitive resin composition 66 parts by weight
  Propylene glycol monomethyl ether acetate 400 parts by weight (Composition of a Coating Solution for a Blue Pattern)
  PB15:6/PV23 dispersion 17 parts by weight
  Photosensitive resin composition 83 parts by weight
  Propylene glycol monomethyl ether acetate 400 parts by weight Comparative Example A black matrix (14.4 μm, film thickness 1.1 μm) was formed in the same manner as in the example except that the development was carried out in an ordinary condition in the above-mentioned developing process. The width of the thick film region at the time was 11.5 μm, and the width of the thin film region was 0.7 μm. Subsequently, a color filter was formed by the same process as in the example. The difference between the maximum film thickness in the stacked part with the colored layer superimposed on a part of the light shielding part of the formed color filter and the film thickness of the central part of the colored layer formed in the opening part of the light shielding part was 0.7 μm.

[Evaluation]

In the case of using a color filter of the example, a liquid crystal display apparatus having a preferable display characteristic can be obtained. On the other hand, in the case of using a color filter of the comparative example, alignment defect was generated in a part thereof.

The invention claimed is:

1. A method for producing a color filter comprising the steps of:
   preparing a light shielding part forming composition containing at least a light shielding material and a resin;
   forming a light shielding part on a transparent substrate by using the light shielding part forming composition; and
   forming a colored layer in an opening part of the light shielding part,
   wherein the step of forming a light shielding part further comprises a process of coating the light shielding part forming composition onto the transparent substrate, using a half tone mask to change an exposing amount to the light shielding part forming composition and forming a shape of the light shielding part as follows:
   a width of a thick film region, 85% or more of a maximum film thickness of the light shielding part and disposed in a central part of the light shielding part, is in a range of 30% to 60% of a light shielding part linear width; and
   a width of each of thin film regions, 50% or less of the maximum film thickness of the light shielding part and disposed on both side parts of the light shielding part, is in a range of 10% to 20% of the light shielding part linear width.

2. The method for producing a color filter according to claim 1, wherein, during the step of forming a colored layer, the colored layer is formed so as to cover a part of the light shielding part, and such that a difference between a maximum film thickness of a superimposed part with the colored layer superimposed on the part of the light shielding part and a film thickness of a central part of the colored layer formed in the opening part of the light shielding part is 0.5 μm or less.

3. The method for producing a color filter according to claim 2, wherein, during the step of forming a colored layer, the colored layer is formed: so as to cover apart of the light shielding part; and so as that the colored layer has a crossing part with the colored layer and the light shielding part crossing each other such that the colored layer covers the light shielding part, and a difference between a maximum film thickness of the crossing part and a film thickness of a central part of the colored layer formed in the opening part of the light shielding part is 0.5 μm or less.

* * * * *